(12) United States Patent
Brown et al.

(10) Patent No.: US 10,146,722 B1
(45) Date of Patent: Dec. 4, 2018

(54) METHOD AND APPARATUS FOR OPERATING OF A PCIE RETIMER OVER OPTICAL CABLE

(71) Applicants: David Alan Brown, Carp Ontario (CA); Dzung Xuan Tran, San Jose, CA (US)

(72) Inventors: David Alan Brown, Carp Ontario (CA); Dzung Xuan Tran, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 1086 days.

(21) Appl. No.: 14/514,736

(22) Filed: Oct. 15, 2014

(51) Int. Cl.
*G06F 13/42* (2006.01)
(52) U.S. Cl.
CPC .............................. *G06F 13/4221* (2013.01)

(58) Field of Classification Search
CPC .................................................. G06F 13/4221
USPC ........................................................... 710/106
See application file for complete search history.

(56) References Cited

U.S. PATENT DOCUMENTS

| 2010/0329285 A1* | 12/2010 | Stanton | G06F 1/14 370/503 |
| 2012/0082463 A1* | 4/2012 | Kasprzyk | H04B 10/40 398/140 |

OTHER PUBLICATIONS http://www.ieee802.org/3/z/public/presentations/mar1996/RT8B10B.pdf (Year: 1996).*

* cited by examiner

*Primary Examiner* — Chun Kuan Lee
(74) *Attorney, Agent, or Firm* — Heimlich Law, PC; Alan Heimlich, Esq.

(57) ABSTRACT

Operation of a PCIe Retimer over an Optical Cable has been disclosed. In one implementation a Optical Idle ordered set (OIOS) is introduced as well as a high Z ordered set (HZOS).

14 Claims, 6 Drawing Sheets

METHOD AND APPARATUS FOR OPERATING OF A PCIE RETIMER OVER OPTICAL CABLE

RELATED APPLICATION

The present Application for Patent claims priority to U.S. Patent Application No. 61/891,616 titled "Method and Apparatus for Operating of a PCIe Retimer over Optical Cable" filed Oct. 16, 2013, and which is hereby incorporated herein by reference.

FIELD OF THE INVENTION

The present invention pertains to operating PCIe Retimer. More particularly, the present invention relates to a Method and Apparatus for Operating of a PCIe Retimer over Optical Cable.

BACKGROUND OF THE INVENTION

PCIe transmitters "detect" the presences of its link partner's receiver as part of the protocol. O/E (Optical/Electrical) interfaces do not provide the correct termination on the electrical side of the interface, and do not provide a mechanism over the optical side of the cable. This interferes with the PCIe protocol. This presents a technical problem for which a technical solution using a technical means is needed.

PCIe uses a differential signaling protocol. Differential signals below 65 mV are defined as Electrical Idle. Electrical Idle is used as part of the PCIe protocol. Optical cable is a single ended interface. When electrical to optical devices are presented with electrical Idle (i.e. a differential signal below 65 mV) random noise is detected and sent over the cable. This interferes with the PCIe protocol. This presents a technical problem for which a technical solution using a technical means is needed.

Optical/Electrical interfaces behave like a simple repeater, i.e. have a fixed de-emphasis on the electrical transmitter. This interferes with the 8.0 GT/s link equalization procedure. This presents a technical problem for which a technical solution using a technical means is needed.

For the CEM specification there are side band signals to support hot plug, PERTSN etc. The side band signals are not supported over an optical interface. This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

In one embodiment of the invention, Electrical Idle is used in the flowing LTSSM states in PCIe protocol. A new ordered set is introduced to the proprietary link across the optical interface, the Optical Idle ordered set (OIOS). This is used to keep the optical link active during data rate changes described herein. The definition is as follows. Note that these ordered sets are not scrambled at 8.0 GT/s, and block lock may be achieved.

1. 8b10b: COM, IDL, IDL, EIE
    a. COM=K28.5
    b. EIE=K28.7
    c. IDL=K28.3
2. 128b130b:
    a. Symbols 0-7=0x66
    b. Symbols 8, 10, 12, 14=0x00
    c. Symbols 9, 11, 13, 15=0xFF In one embodiment of the invention, a second ordered set is introduced to the proprietary link across the optical interface, the high Z ordered set (HZOS). This ordered set is used to back propagate the Rx high impedance over the optical interface. It is defined as follows. Note that these ordered sets are not scrambled at 8.0 GT/s, and block lock may be achieved.

1. 8b10b: COM, EIE, EIE, IDL
    a. COM=K28.5
    b. EIE=K28.7
    c. IDL=K28.3
2. 128b130b:
    a. Symbols 0, 2, 4, 6=0x00
    b. Symbols 1, 3, 5, 7=0xFF
    c. Symbols 8-15=0x66

In one embodiment of the invention, a modified SKPOS is used for side band data.

1. Modified 8b10b: COM, SKP, D, SKP
    a. COM=K28.5
    b. SKP=K28.0
    c. D=8 bits of side band data encoded to 10 bit symbol
3. Modified 128b130B, 4 symbol sequence:
    a. SKP symbol, start/end: 0xAA/0xE1
    b. LFSR
    c. LFSR
    d. LFSR
    The third SKP symbol is replaced with D code
    modified every 4th symbol: 0xAA, 0x1E, 0xDD, 0x1E In one embodiment of the invention, a Retimer tracks the PCIe protocol between the upstream port and downstream port of the Link Components. The Retimer forwards symbols from its receiver to its transmitter. When the Retimer detects electrical Idle on its Receiver, it will place its corresponding transmitter in electrical idle. The Retimer must track the LTSSMs of the Link Components so it knows when to do a data rate change, and what data rate to change to. The data rate change occurs during Recovery.Speed; while the transmitters are in electrical idle. In one embodiment of the invention, the port of the Retimer that is facing the optical cable must be configured such that its behavior is different, i.e. it does not place its transmitter in electrical idle.

Figure 1:
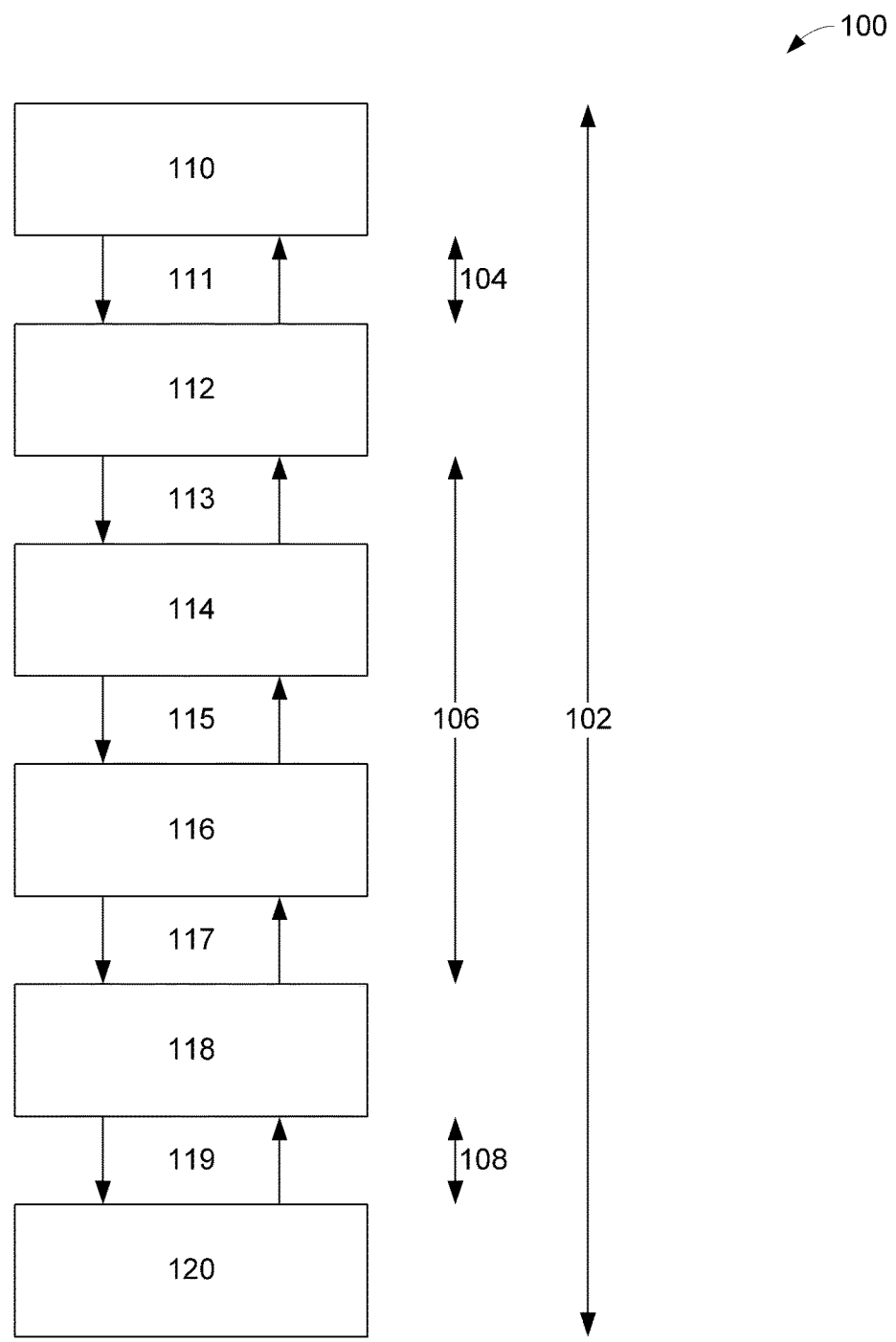
FIG. 1 shows one embodiment of the invention showing a System block diagram.

FIG. 1 illustrates, generally at 100, one embodiment of the invention showing a System block diagram. At 102 is a Link, at 104 a first sub link, at 106, a second sub link, and at 108 a third sub link. At 110 is an Upstream Link Component with a Downstream port interfacing at 111 a first electrical interface. At 112 is an Upstream Retimer having an Upstream port interfacing at 111 a first electrical interface, and having a Downstream port interfacing at 113 a second electrical interface. At 114 is an Upstream Optical/Electrical Component having a port interfacing at 113 a second electrical interface, and having a port interfacing at 115 an optical interface. At 116 is a Downstream Optical/Electrical Component having a port interfacing at 115 an optical interface, and having a port interfacing at 117 an electrical interface. At 118 is an Downstream Retimer having an Upstream port interfacing at 117 a third electrical interface, and having a Downstream port interfacing at 119 a fourth electrical interface. At 120 is an Downstream Link Component with an Upstream port interfacing at 119 a fourth electrical interface.

In one embodiment of the invention a Detect electrical interface operates as follows. The power on state of the Retimer is detect. While in detect the Rx is in high impedance. Each port facing a link component performs Rx Detect. If successful, the corresponding Rx impedance is turned on, see below. This way the Retimer acts as a wire back propagating low impedance if it finds it. For example, FIG. 2, if the downstream port were attached to an open slot, it would not detect a low impedance, and thus leave its upstream Rx in high impedance.

Figure 2:
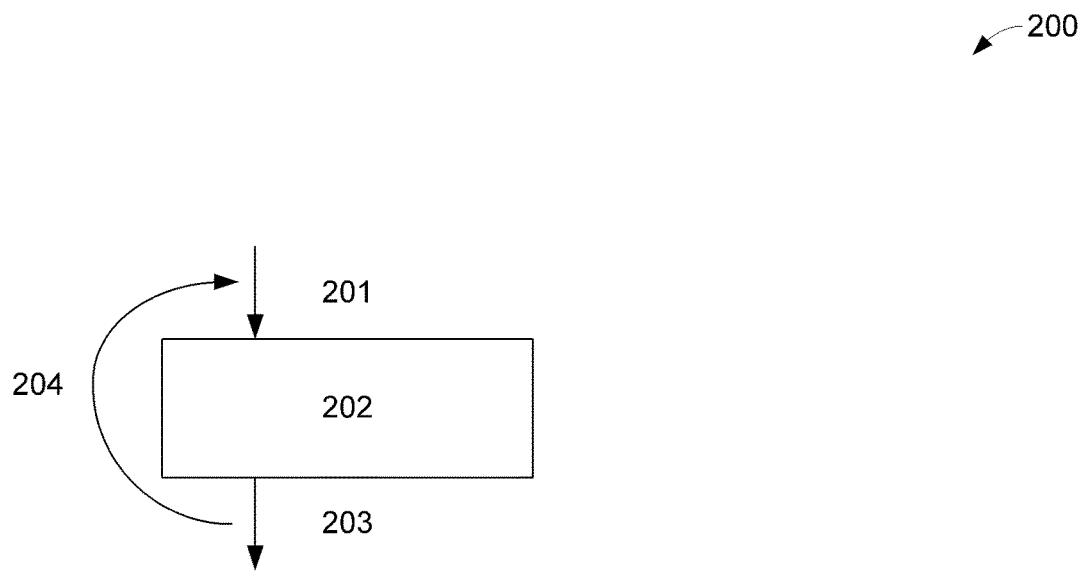
FIG. 2 shows one embodiment of the invention showing a Detect (electrical).

FIG. 2 illustrates, generally at 200, one embodiment of the invention showing a Detect electrical. At 201 is a Low impedance enabled. At 202 is a Retimer having an Upstream port in communication with 201 a Low impedance enabled, and having a Downstream port in communication with 203 a Low impedance detected. At 204 is an illustration of how the Retimer acts as a wire back propagating the low impedance if it finds it.

In one embodiment of the invention a Detect optical interface operates as follows. The power on state of the Retimer is detect. While in detect the Rx is in high impedance for the receivers facing the link component, and low impedance for the receivers facing the optical link. The Receiver facing the optical link is hard wired in low impedance. For the transmitters facing the optical cable, Rx Detect is not performed by the transmitters. In order for Rx detect to be successful the single ended receive 50 ohm impedance must be DC coupled to ground. In general optical/electrical components do not use DC coupled impedance to ground, and thus the receivers would not be detected. In addition what is required, from a link perspective, is to back propagate the Rx impedance of the two link components to each other.

Figure 3:
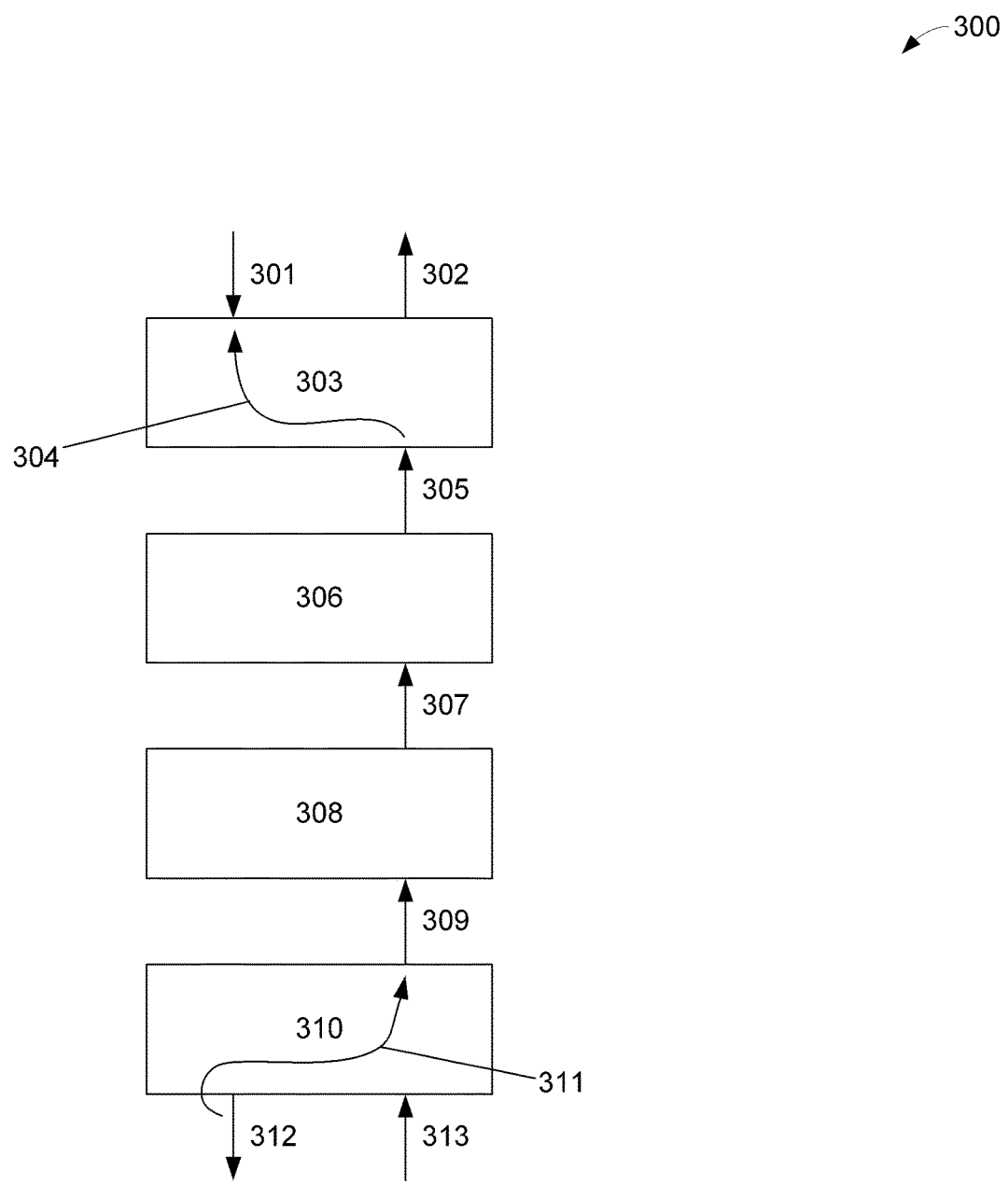
FIG. 3 shows one embodiment of the invention showing a Detect Optical.

FIG. 3 illustrates, generally at 300, one embodiment of the invention showing a Detect Optical and is used for the following discussion that describes how the impedance from the Downstream Link Component is propagated to the Upstream Link Component. The impedance is propagated in the opposite direction as well, by the same mechanism.

At 313 is a EI to TS1s transition to the Downstream port of Downstream Retimer 310. At 312 is Low impedance detected that goes through Downstream Retimer 310 as illustrated at 311 to Downstream Retimer 310's Upstream port which is connected to Electrical 309 which has a HZOS to IEOS to TS1s transition. Optical/Electrical Component 308 is connected to Electrical 309 and to Optical 307 which has a HZOS to IEOS to TS1s transition. Optical/Electrical Component 306 is connected to Optical 307 and to Electrical 305 which has a HZOS to IEOS to TS1s transition.

At 303 is a Upstream Retimer having a Downstream port connected to Electrical 305 and illustrating at 304 a Low Z at Upstream Retimer 303's Downstream port being propagated to Upstream Retimer 303's Upstream port to 301 Low impedance enabled. Upstream Retimer 303's Upstream port is also connected to 302 which has a EI to TS1s transition.

When the upstream transmitters of the Downstream Retimer (i.e. the transmitters facing the optical cable) enter detect, it immediately exits detect and the transmitters sends HZOS at 2.5 GT/s. SKPOS are sent as well to allow for clock compensation in the PCS. Sending continuous HZOS (and SKPOS) keeps the optical link out of electrical idle, and it also signals to the Upstream Retimer that low impedance has not been detected on the associated transmitter, and thus it shall keep its impedance high on its upstream receivers. When the Upstream Retimer's downstream receivers receives continuous HZOS, it places its associated transmitters in electrical Idle.

Receiving HZOS (or EIOS) will not permit polarity inversion correction, as each K symbol has 2 values one for each disparity, and they are bit inversions of each other. The receiver will be able to decode this ordered set regardless of polarity inversion. The receiver must wait until TS1s are received in polling. Active where polarity inversion is performed.

If low impedance is detected by the downstream transmitters of the Downstream Retimer the HZOS are replaced by EIOS. Receiving EIOS (or any non HZOS ordered set) informs the Upstream Retimer that a receiver was detected by the Downstream Retimer and thus to turn on the associated Rx impedance, i.e. its upstream receivers. SKP ordered sets are sent by the upstream port of the Downstream Retimer while sending EIOS, to allow clock compensation in the PCS. The upstream transmitters of the Upstream Retimer transmitters remain in electrical idle.

When the Downstream Link Component enters Polling.Active it transmits TS1s. The TS1s are forwarded upstream as indicated. The Downstream Link Component generates SKPOS, and thus the Retimers do not. Note that for the Downstream Link Component to be sending TS1s, it must have seen low impedance and therefore non HZOS ordered sets were received by the Downstream Retimer.

Figure 4:
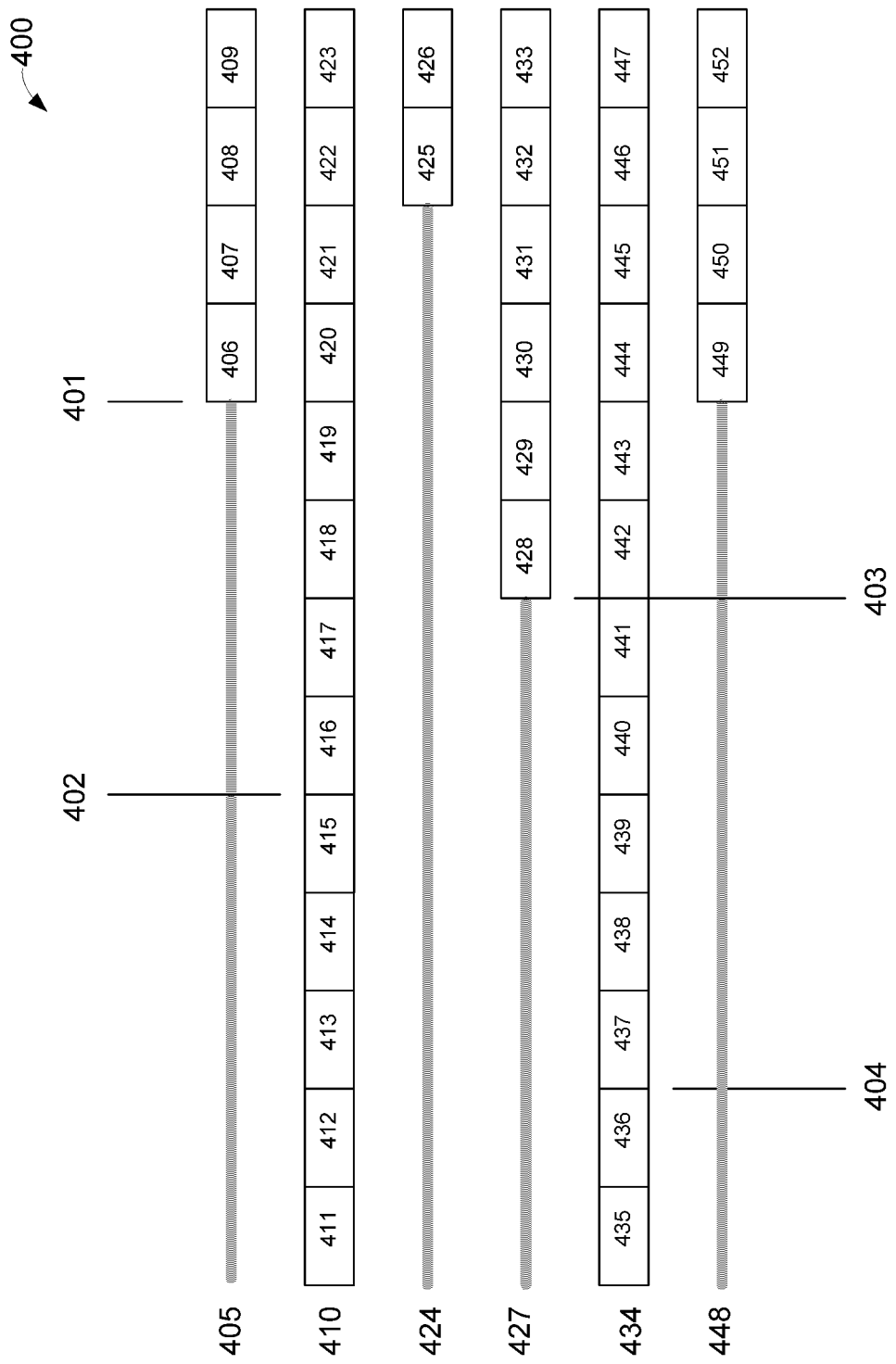
FIG. 4 shows one embodiment of the invention showing Detect Timing.

FIG. 4 illustrates, generally at 400, one embodiment of the invention showing Detect Timing. Out of reset both Retimer ports send HZOS across the optical link.

The Upstream Retimer detects low impedance, the RC is present. Now the Upstream Retimer sends EIOS downstream indicating that it detected low impedance on the Upstream Link Component. The Downstream Retimer sets its Rx to low impedance facing the downstream component.

Sometime later the downstream component is plugged in. The Downstream Retimer detects low impedance of the Downstream Link Component and sends EIOS upstream. The Upstream Retimer sets its Rx to low impedance facing the Upstream Linkc Component.

The Upstream Link Component detects low impedance and sends TS1s, that are propagated downstream. The Downstream Link Component detects low impedance and sends TS1s, which are propagated upstream.

In the case where one end of the optical cable is in reset or not present, the active end will not receive non HZOS and thus keeps its Rx high impedance facing the link component.

As shown in FIG. 4 in detail Detect Timing is as follows. At 401 is where Downstream Link Component detects 50 ohms. At 402 is where Downstream Retimer detects 50 ohms. At 403 is where Upstream Link Component detects 50 ohms. At 404 is where Upstream Retimer detects 50 ohms. At 405 is a time sequence showing Upstream port transmitter Downstream Link Component. At 410 is a time sequence showing Upstream port transmitter Downstream Retimer. At 424 is a time sequence showing Upstream port transmitter Upstream Retimer. At 427 is a time sequence showing Downstream port transmitter Upstream Link Component. At 434 is a time sequence showing Downstream port transmitter Upstream Retimer. At 448 is a time sequence showing Downstream port transmitter Downstream Retimer.

For 407 at 406, 407, 408, and 409 are TS1s.

For 410 at 411, 412, 413, 414, and 415 are HZOS. At 416, 417, 418, 419, and 420 are EIOS. At 421, 422, and 423 are TS1s.

For 424 at 425, and 426 are TS1s.

For 427 at 428, 429, 430, 432, 432, and 433 are TS1s.

For 434 at 435, and 436 are HZOS. At 437, 438, 439, 440, and 441 are EIOS. At 443, 444, 445, 446, and 447 are TS1s.

For 448 at 449, 450, 451, and 452 are TS1s.

In one embodiment of the invention, Lanes that did not detect a receiver during detect (electrical interface) have the following behavior. Transmit lanes that do not detect a receiver in detect remain in electrical idle, and keep their corresponding receiver in high impedance.

In one embodiment of the invention, Lanes that did not detect a receiver during detect (optical interface) have the following behavior. The following description refers to a Receiver not detected by the downstream transmitter of the Downstream Retimer. Transmit lanes that do not detect a receiver facing the link component in detect remain in electrical idle. HZOS are sent continuously by the upstream transmitters of the Downstream Retimer, facing the optical interface. Continuous HZOS received by the downstream receiver of the Upstream Retimer have two effects on the Upstream Retimer: the transmitter remains in electrical idle, and the receiver impedance remains high. HZOS are replaced by OIOS during data rate changes, as described in Recovery.Speed below.

In one embodiment of the invention L0s (electrical interface) have the following behavior. L0s is a low power state. When the transmitter of a link component enters L0s, it places its transmitters in electrical idle. The last symbol prior to entering electrical idle is the EIOS. When the Retimer receiver decodes the EIOS, it places its associated transmitters in electrical idle. When the Retimer receiver detects an exit from electrical idle, and achieves symbol/block lock it forwards the symbols on the associated transmitter.

In one embodiment of the invention L0s (optical interface) have the following behavior. L0s is a low power state. When the transmitter of a link component enters L0s, it places its transmitters in electrical idle. The last symbol prior to entering electrical idle is the EIOS. When the Retimer receiver, facing the link component, decodes the EIOS, its associated transmitters send EIOS continuously; while its receivers remain in electrical idle. The mate Retimer will receive continuous EIOS and discard, keeping its transmitter (facing the link component) in electrical idle. SKP ordered sets are sent during this interval. When the Retimer receiver, facing the link component, detects an exit from electrical idle and achieves symbol/block lock it forwards these symbols across the optical link. The mate receiver decodes the non EIOS symbols and forwards those to the link component.

In one embodiment of the invention a Retimer does not differentiate between L1 and L0s, the behavior is the same.

In one embodiment of the invention Recovery.Speed (electrical) have the following behavior. When the Retimer enters Recovery.Speed receivers on both ports will receive EIOS and place their respective transmitters in EI. Each port then adjusts their data rate in concert with the link components to the new data rate. When the link components exit electrical idle and start sending TS1s, the Retimer will forward the TS1s once its data rate change is complete and it achieves symbol/block lock on the received TS1s.

In one embodiment of the invention Recovery.Speed (optical) have the following behavior. When the Retimer enters Recovery.Speed receivers on the port facing the link components will receive an EIOS and remain in electrical idle for a period of time. The receiver facing the link component will ignore an exit from electrical idle until it has changed speed to the new data rate. The associated transmitters will send continuous EIOS (with SKPOS) towards the optical interface at the current data rate. When the receiver facing the optical interface receives continuous EIOS it places its associated transmitters, i.e. facing the link component, in electrical idle. When the port facing the optical interface has received at least 2 EIOS and has transmitted 32 EIOS, the transmitter switches to OIOS (with SKPOS), at the current data rate. When the port facing the optical interface has received at least 2 OIOS and has transmitted 32 OIOS at the current data rate, the transmitters facing the optical link are placed in electrical idle and the port data rate changes to the new data rate. Noise will be generated by the Optical/Electrical such that random data will appear at the receivers of the Retimer facing the optical link, while the transmitters facing the optical interface are in electrical idle. Programmable delays determine how long the receivers will ignore this random data, before it starts searching for OIOS at the new data rate. After some interval the Retimer is stable at the new data rate, and OIOS is being sent over the optical interface. The retimer continues to send OIOS over the optical interface at the new data rate until it receives 2 OIOS, and transmits 32 OIOS. After this interval, the transmitters facing the optical interface switch to EIOS. If the receiver facing the link component detects electrical idle exit and achieves symbol/block lock then it forwards the TS1s over the optical interface.

Figure 5:
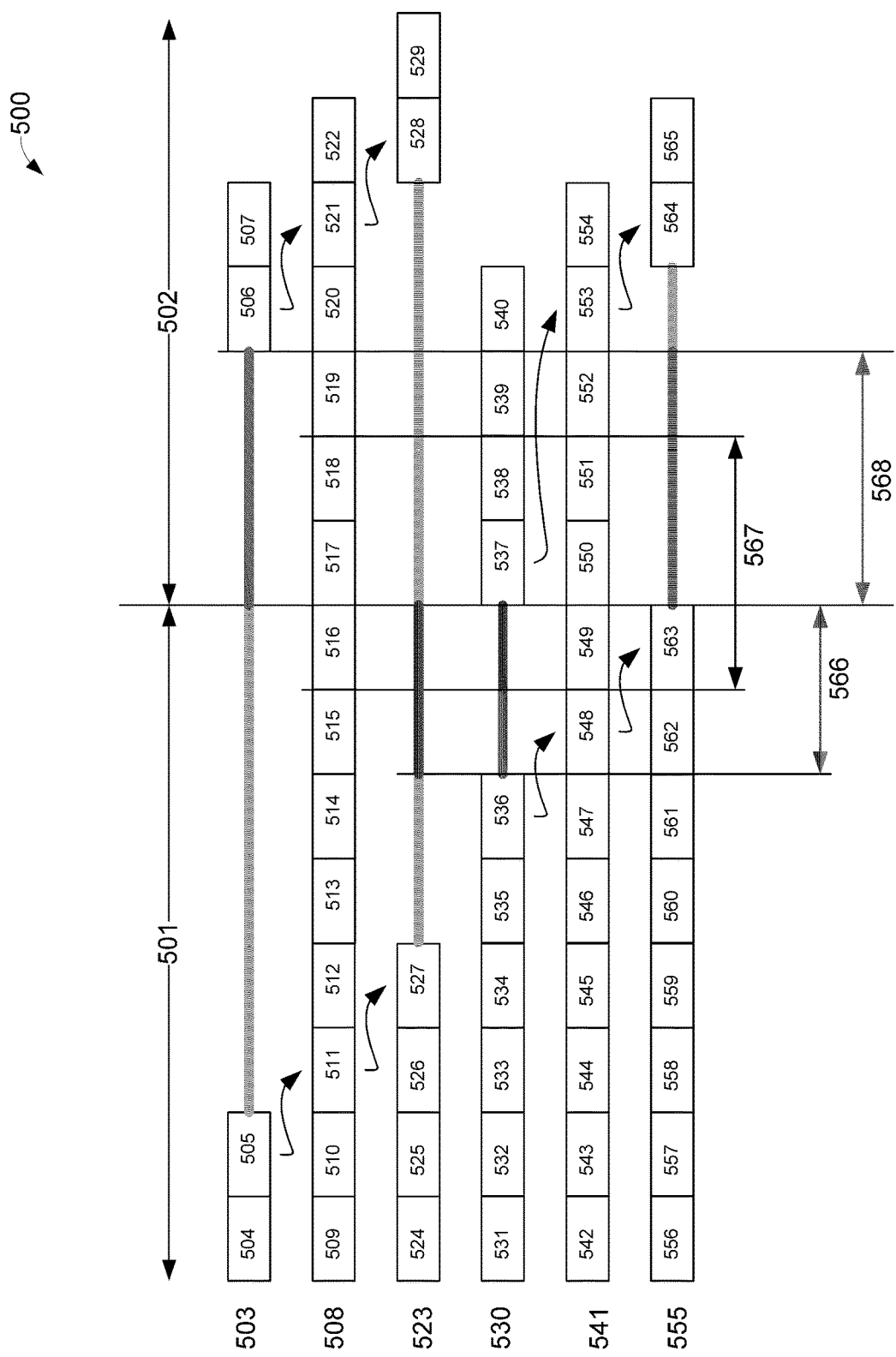
FIG. 5 shows one embodiment of the invention showing Recovery.Speed.

FIG. 5 illustrates, generally at 500, a timing diagram for Recovery.Speed. At 501 is Old data rate where there are notations. At 502 is New data rate where there are notations other than unknowns (XXX). At 503 is a time sequence showing Upstream port transmitter Downstream Link Component. At 508 is a time sequence showing Upstream port transmitter Downstream Retimer. At 523 is a time sequence showing Upstream port transmitter Upstream Retimer. At 530 is a time sequence showing Downstream port transmitter Upstream Link Component. At 541 is a time sequence showing Downstream port transmitter Upstream Retimer. At 555 is a time sequence showing Downstream port transmitter Downstream Retimer.

For 503 at 504 is TS1s, at 505 is EIOS, at 506 is EIEOS, and at 507 is TS1s.

For 508 at 509 and 510 is TS1s; at 511, 512, 513, 514, and 515 is EIOS; at 516 is OIS; at 517 is unknown (XXX); at 518 is OIS, at 519 and 520 is EIOS; at 521 is EIEOS, and at 522 is TS1s.

For 523 at 524, 525, and 526 is TS1s; at 527 is EIOS; at 528 is EIEOS; and at 529 is TS1s.

For 530 at 531, 532, 533, 534, and 535 is TS1s; at 536 is EIOS; at 537 is EIEOS, at 538, 539, and 540 is TS1s.

For 541 at 542, 543, 545, 546, and 547 is TS1s; at 548 is EIOS; at 549 is OIS; at 550 is unknown (XXX); at 551 is OIS, at 552 is EIOS; at 553 is EIEOS; and at 554 is TS1s.

For 555 at 556, 557, 558, 559, 560, 561, and 562 is TS1s; at 563 is EIOS; at 564 is EIEOS; and at 565 is TS1s.

The electrical idle 566, 567, and 578 indicates when each side of the link is in electrical idle. The link number 566 corresponds to 111 as shown in FIG. 1 System block diagram, 567 corresponds to 113 and 117 in FIG. 1 System block diagram, and 568 corresponds to 119 in FIG. 1 System block diagram. Both sides of the link must be in electrical idle before either side may start transmitting at the new data rate.

In one embodiment of the invention Loopback (electrical interface) has the following behavior. Loopback occurs between the loopback master and loopback slave, these are the link components. Retimers do not terminate loopback. If loopback is entered from configuration then a speed change will occur if the current data rate is lower than the highest supported data rate between the two link components. The loopback master will be in electrical idle for 1 ms during its data rate change, and the loopback slave will be in electrical idle for 2 ms during its data rate change. Retimers pass on the ordered sets and change data rate while on electrical idle.

In one embodiment of the invention Loopback (optical interface) has the following behavior. The Retimers track the loopback state and change data rate if required. The difference here is that the transmitters facing the optical link will send OIOS at the old data rate, and then OIOS at the new data rate, rather than electrical idle.

In one embodiment of the invention 8.0 GT/s link equalization procedure has the following behavior. The link equalization procedure is initiated by the downstream port of Upstream Link Component. In order to ensure proper BER performance phase 2/3 of the link equalization procedure is run independently over each sub link. During phase 2/3 (of the upstream port of the Downstream Retimer/downstream port of the Upstream Retimer) only a single Tx requests is made, and the Rx is equalized. The O/E component acts as a repeater it will use a fixed de-emphasis, it is not aware of the link equalization procedure. The de-emphasis of the O/E transmitter must be manually tuned based on channel loss etc. The Tx request that is made, is chosen to optimize the channel and O/E receiver. Making a single Tx request allows interoperability with O/E devices in the path. Manual settings of the O/E receiver parameters (CTLE, etc) and the transmit de-emphasis is required.

Figure 6:
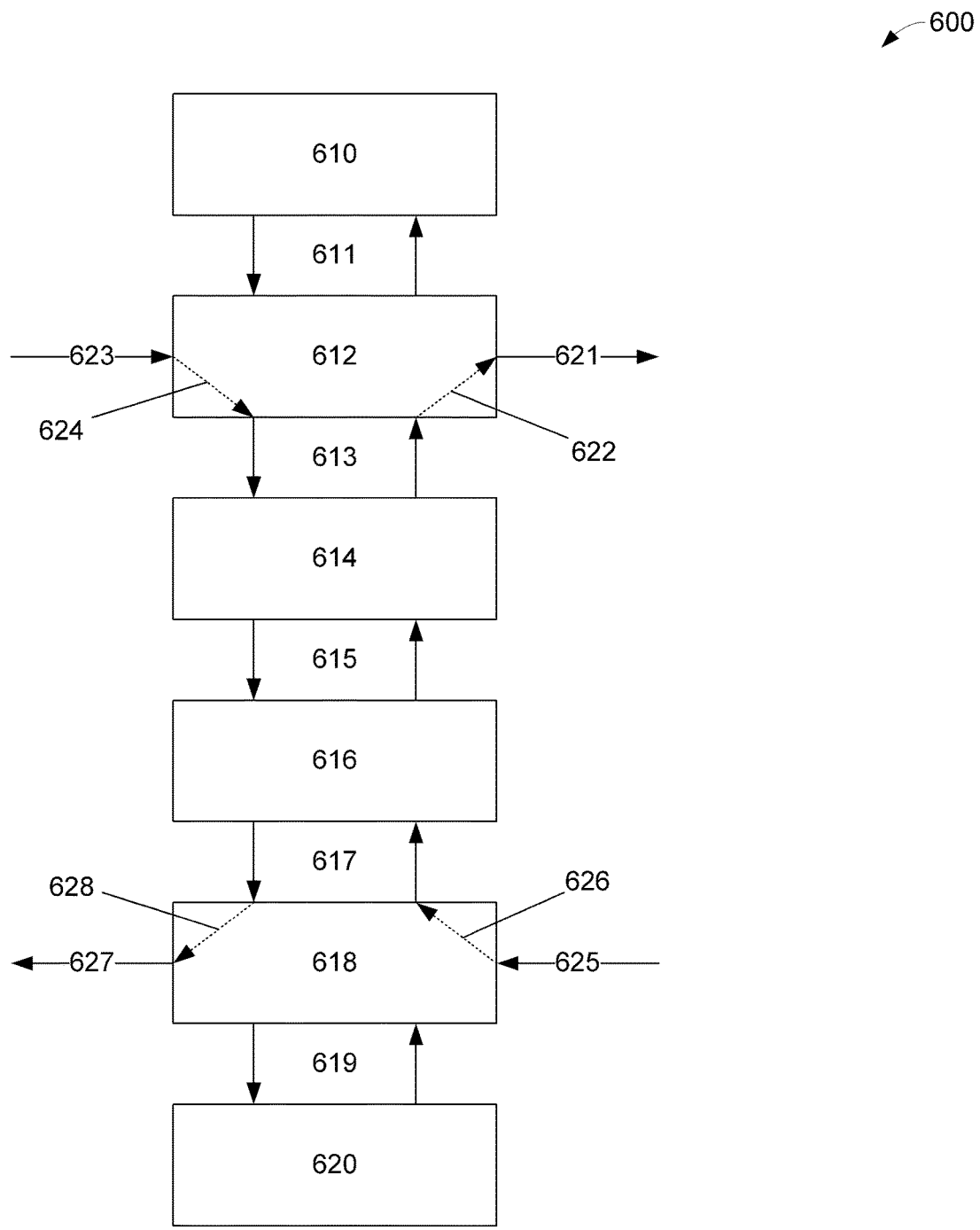
FIG. 6 shows one embodiment of the invention showing Side Band.

FIG. 6 illustrates, generally at 600, one embodiment of the invention for Side band data. Side band data may be sent across in a single Data byte, in each direction, as shown in FIG. 6 Side Band. The Upstream Link Component and Upstream Retimer must run on a common clock. The Downstream Link Component and Downstream Retimer must run on a common clock. The two common clocks can be different. Clock compensation will only remove, or add one SKP symbol (or block at 128b130b) over the optical link. Therefore the second SKP symbol (which now contains the 8 bits of side band) will make it past the clock compensation, and thus can be extracted at the other end of the link.

At 610 is an Upstream Link Component with a Downstream port interfacing at 611 a first electrical interface. At 612 is an Upstream Retimer having an Upstream port interfacing at 611 a first electrical interface, and having a Downstream port interfacing at 613 a second electrical interface. At 614 is an Upstream Optical/Electrical Component having a port interfacing at 613 a second electrical interface, and having a port interfacing at 615 an optical interface. At 616 is a Downstream Optical/Electrical Component having a port interfacing at 615 an optical interface, and having a port interfacing at 617 an electrical interface. At 618 is an Downstream Retimer having an Upstream port interfacing at 617 a third electrical interface, and having a Downstream port interfacing at 619 a fourth electrical interface. At 620 is an Downstream Link Component with an Upstream port interfacing at 619 a fourth electrical interface. At 623 is a Downstream Side Band[7:0] input showing at 624 the side band data path. At 628 is a side band data path going to 627 a Downstream Side Band[7:0] output. At 625 is a Upstream Side Band[7:0] input showing at 626 the side band data path. At 622 is a side band data path going to 621 a Upstream Side Band[7:0] output.

One of skill in the art understands that current PCS logic achieves block lock at 8.0 GT/s only on EIEOS. The techniques described above require specialized hardware changes to the PCS layer at 8.0 GT/s as the PCS must achieve block lock on OIOS and HZOS. This specialized hardware may be located in a variety of blocks within a system, for example, but not limited to, block 112 and 118 in FIG. 1.

However the invention is not so limited and without modifying current PCS the techniques disclosed may be used, for example, but not limited to, creating a sequence of order sets to indicate the "super order set", for example:
1. OIOS: EIOS+EIOS+EIEOS
2. HZOS: EIEOS+EIOS+EIOS This requires specialized hardware for decoding at the MAC layer, to generate and decode the sequence of super ordered sets.

Also the invention is not limited to sending single bytes of side band information. For example, sending "N" side band bytes is also possible, by interleaving SKPOS. For example send a normal SKPOS to indicate start, and then send "N" modified SKPOS after that, where each modified SKPOS has the second SKP symbol replaced with a D code.

Thus a Method and Apparatus for Operating of a PCIe Retimer over Optical Cable has been described.

Because of the high speed and noise considerations in embodiments of the present invention specialized hardware is required.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Operating of a PCIe Retimer over Optical Cable has been described.

What is claimed is:

1. A method comprising:
communicating an Optical Idle ordered set during Electrical Idle in a flowing LTSSM states in a Peripheral Component Interconnect Express (PCIe) protocol, wherein said Optical Idle ordered set keeps an optical link active during data rate changes;
wherein said Optical Idle ordered set is for either:
a 8b10b COM, IDL, IDL, EIE is COM=K28.5, EIE=K28.7, and IDL=K28.3; or
a 128b130b is Symbols 0-7=0x66, Symbols 8, 10, 12, 14=0x00, and Symbols 9, 11, 13, 15=0xFF.

2. The method of claim 1 wherein said Optical Idle ordered set are K codes different from any D codes.

3. The method of claim 1 wherein said Optical Idle ordered set is not scrambled at 8.0 GT/s, and block lock can be achieved.

4. The method of claim 1 wherein an existing PCS may be used without modification by using a super order set to indicate said Optical Idle ordered set.

5. The method of claim 4 wherein said super order set for said Optical Idle ordered set is EIOS+EIOS+EIEOS.

6. A method comprising:
communicating a high Z ordered set for back propagating a Rx high impedance over an optical interface in a Peripheral Component Interconnect Express (PCIe) protocol;
wherein said high Z ordered set is either for:
a 8b10b: COM, EIE, EIE, IDL is COM=K28.5, EIE=K28.7, and IDL=K28.3; or
a 128b130b is Symbols 0, 2, 4, 6=0x00, Symbols 1, 3, 5, 7=0xFF, and Symbols 8-15=0x66.

7. The method of claim 6 wherein said high Z ordered set is not scrambled at 8.0 GT/s, and block lock can be achieved.

8. The method of claim 6 wherein an existing PCS may be used without modification by using a super order set to indicate said high Z ordered set.

9. The method of claim 8 wherein said super order set for said high Z ordered set is EIEOS+EIOS+EIOS.

10. An apparatus comprising:
a Peripheral Component Interconnect Express (PCIe) Retimer operating over an optical cable, the apparatus comprising:
a specialized hardware block having an input and an output, said specialized hardware block input capable of receiving Optical Idle ordered set (OIOS) and high Z ordered set (HZOS), achieving block lock on said OIOS and HZOS at 8.0 GT/s, and said output indicating said block lock;
wherein said OIOS is for either:
a 8b10b COM, IDL, IDL, EIE is COM=K28.5, EIE=K28.7, and IDL=K28.3; or
a 128b130b is Symbols 0-7=0x66, Symbols 8, 10, 12, 14=0x00, and Symbols 9, 11, 13, 15=0xFF; and
wherein said HZOS is either for:
a 8b10b: COM, EIE, EIE, IDL is COM=K28.5, EIE=K28.7, and IDL=K28.3; or
a 128b130b is Symbols 0, 2, 4, 6=0x00, Symbols 1, 3, 5, 7=0xFF, and Symbols 8-15=0x66.

11. The apparatus of claim 10 further comprising an Upstream Optical/Electrical component in communication with said optical cable and in communication with an Upstream Retimer, and a Downstream Optical/Electrical component in communication with said optical cable and in communication with a Downstream Retimer.

12. The apparatus of claim 11 further comprising an Upstream Link Component in communication with said Upstream Retimer and wherein said Upstream Link Component and said Upstream Retimer run on a first common clock, and a Downstream Link Component in communication with said Downstream Retimer and wherein said Downstream Link Component and said Downstream Retimer run on a second common clock.

13. The apparatus of claim 12 wherein said first common clock and said second common clock are not a same clock.

14. The apparatus of claim 13 wherein a port of said Upstream Retimer facing said optical cable does not place its transmitter in electrical idle, and wherein a port of said Downstream Retimer facing said optical cable does not place its transmitter in electrical idle.

* * * * *